United States Patent [19]

Sheldon et al.

[11] 4,180,240
[45] Dec. 25, 1979

[54] LOW NOISE LEVEL CONTROL VALVE

[75] Inventors: Robert S. Sheldon; Jan W. Rabek, both of Northridge, Calif.

[73] Assignee: Air-Dry Corporation of America, Northridge, Calif.

[21] Appl. No.: 861,266

[22] Filed: Dec. 16, 1977

[51] Int. Cl.² ............... F16K 47/02; F16K 25/00
[52] U.S. Cl. .................... 251/127; 251/282; 251/333
[58] Field of Search ............ 251/210, 127, 333, 334, 251/282,

[56] References Cited

U.S. PATENT DOCUMENTS

| | | | |
|---|---|---|---|
| 1,645,601 | 10/1927 | Lee | 251/127 X |
| 2,114,858 | 4/1938 | Rosch | 251/333 X |
| 2,181,059 | 11/1939 | Lee | 251/210 X |
| 2,489,623 | 11/1949 | Delany | 251/210 |
| 3,945,390 | 3/1976 | Huber | 251/210 X |

Primary Examiner—Arnold Rosenthal
Attorney, Agent, or Firm—Lyon & Lyon

[57] ABSTRACT

A low noise level valve for controlling high pressure fluid flow between an inlet and an outlet. The valve comprises a poppet movable along a given line with respect to a complementarily formed valve seat. The area between the poppet and valve seat comprises a series of spaced undulations which extend along a continuous curve of approximately 90°. The undulations are disposed substantially parallel to the direction of poppet movement adjacent to the inlet and are substantially transverse adjacent to the outlet. The undulations define a plurality of orifices which are opened progressively from the outlet toward the inlet. The orifices act as pressure drops and also cause turbulence as fluid flows around the undulations, thereby holding the fluid flow below undesirable speed and noise levels. A balancing chamber may be provided to counter-balance the poppet movement. Sealing means may be provided by an undercut lip formed on a sealing member adjacent to the inlet.

20 Claims, 4 Drawing Figures

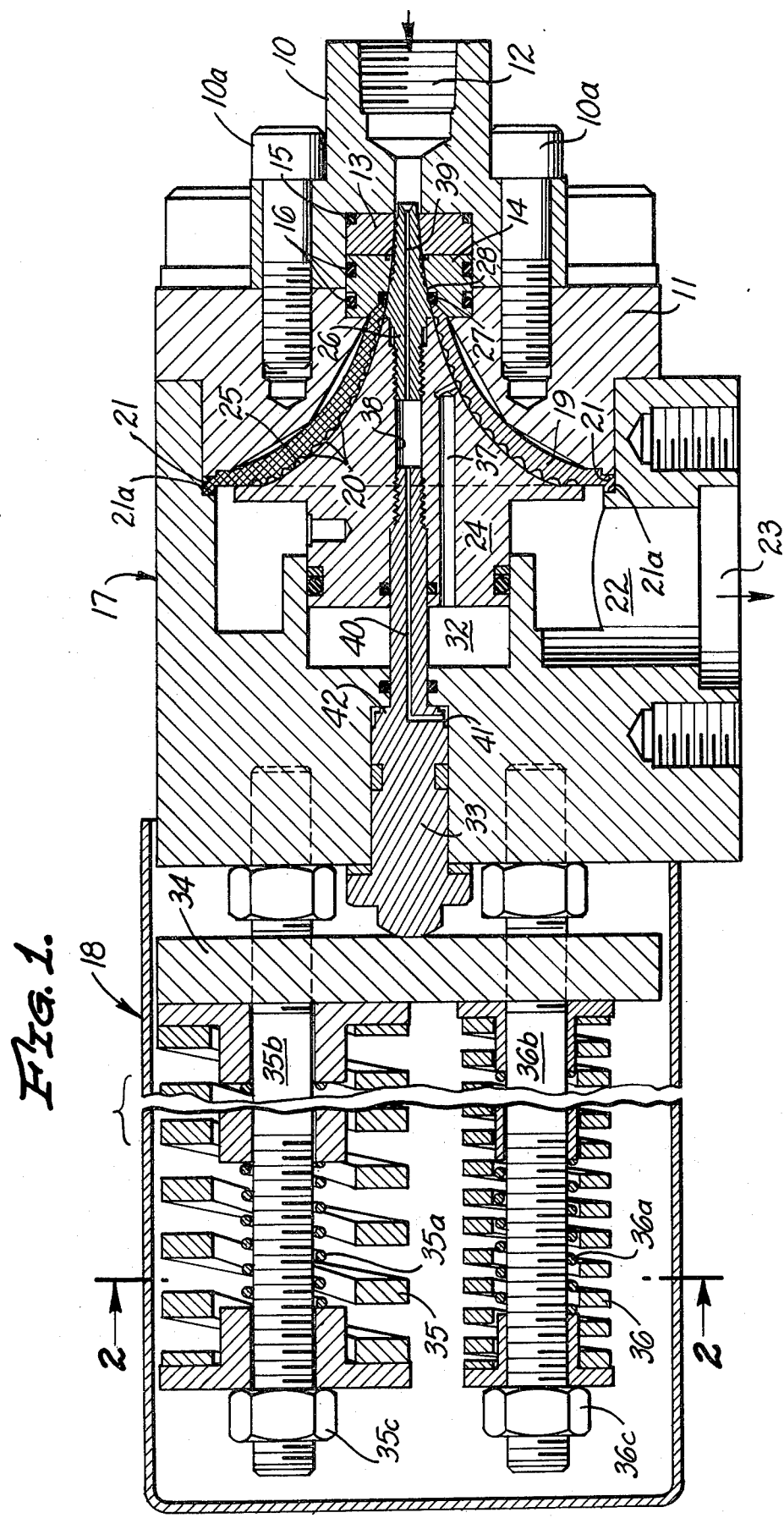

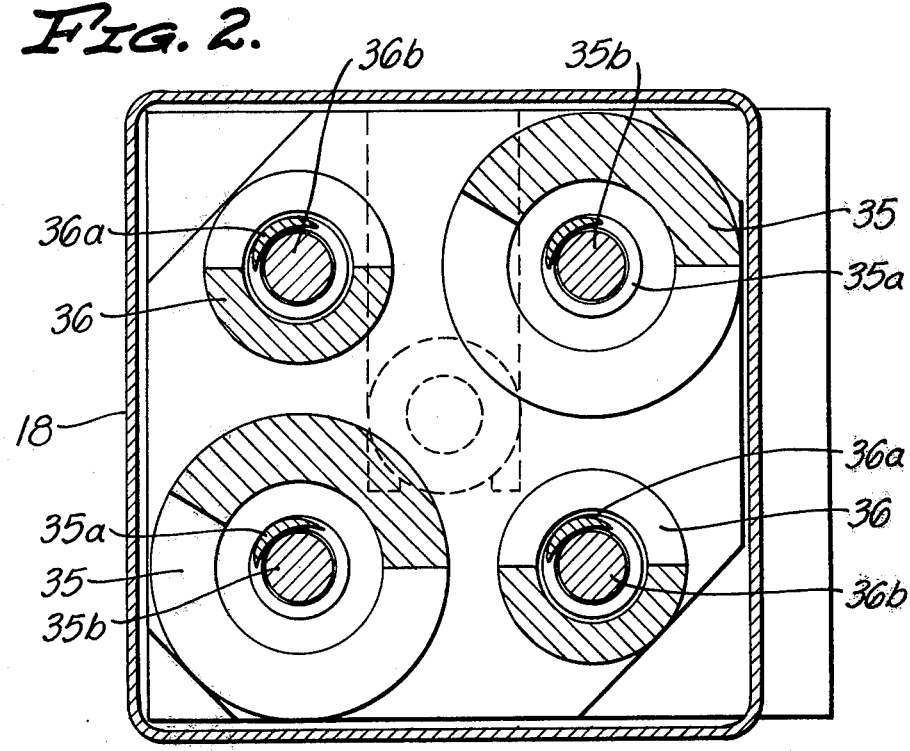
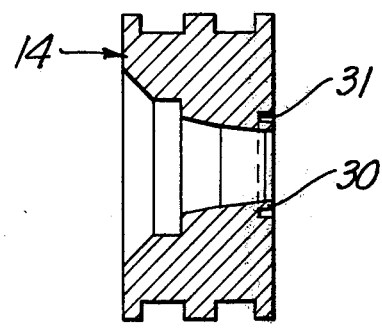
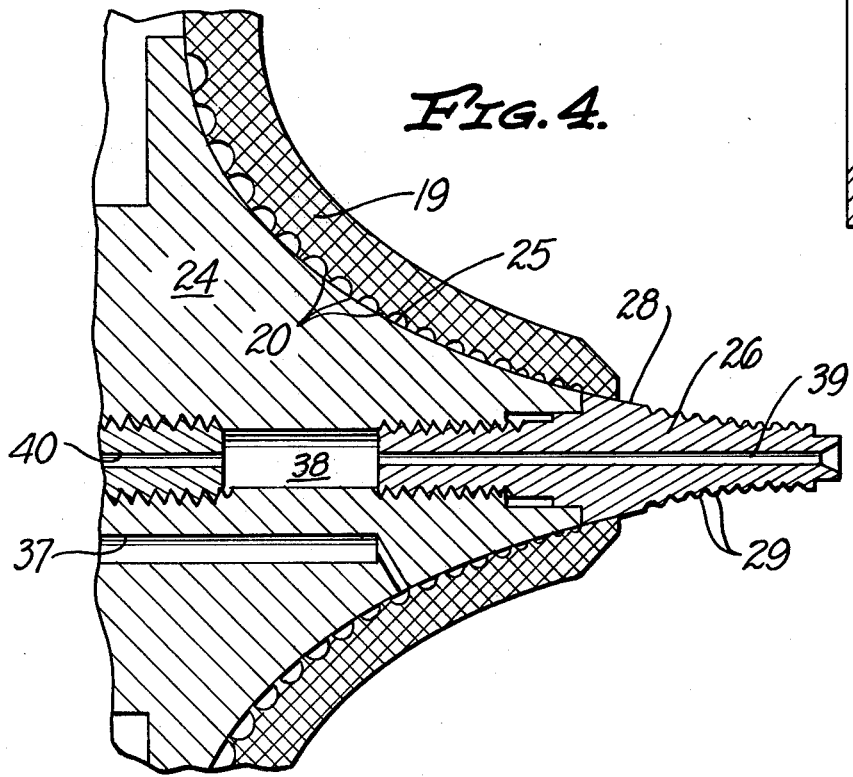

LOW NOISE LEVEL CONTROL VALVE

BACKGROUND OF THE INVENTION

1. Field of the Invention

The invention relates to a low noise level control valve for use in high velocity flow applications.

2. Description of the Prior Art

The art in this field is believed to be best set forth in an article entitled "Liquid Control Valves" published in "Chemical Engineering" on May 6, 1972, p. 92-98.

As stated in the article, high velocity flow through valves frequently results in problems of erosion, erratic control, vibration, shutoff leakage and noise. The problem of noise is dealt with in detail in page 94 of the article.

Hydraulic and pneumatic valves of the type now in use frequently produce noise to an extent which may exceed legal limits. In pneumatic valves, this results primarily from aerodynamic noise caused by turbulence and shock waves due to the high velocity of the fluid flow.

SUMMARY OF THE INVENTION

The control valve of the present invention is an improvement upon existing valves of the staged-trim type. While prior valves of this type have used a "Christmas tree" configuration, the valve of the present invention provides a plurality of successive stages of progressively increasing diameter which are arranged along a continuous curve which extends from vertical adjacent to the inlet to horizontal adjacent to the outlet.

In a conventional Christmas tree type of staged-trim valve, movement of the poppet toward an open position results in opening all of the seats or orifices at the same time and to the same extent. With the valve of the present invention, movement of the poppet toward open position results in opening the large orifices around the outlet almost completely because they are oriented transversely to the direction of the poppet movement. At the same time, the other orifices are opened to lesser degrees, progressing to extremely small openings adjacent to the inlet.

It is accordingly a primary object of the invention to provide a valve of the type and configuration described, in which a series of progressive orifices is created in a manner distinctly different from anything found in the prior art.

It is also among the objects of the invention ot provide a valve in which the effective poppet stroke increases progressively from the inlet to the outlet.

Another object of the invention is to provide a valve in which the orifice area increases progressively from inlet to outlet to a greater degree than a Christmas tree configuration, due to the continuous curvature of the orifice pattern.

A further object of the invention is to provide a valve of the type described which is particularly adapted for use as a priority valve or back-pressure regulator. It is particularly adapted for use in applications such as a compressor discharging into a high pressure tank.

Another object of the invention is to provide a control valve in which the orifices of smaller diameters are placed in the high pressure area, with the orifices of larger diameters in the low pressure area in which additional space is required due to the increased volume resulting from the lower pressures.

It is a further object of the invention to provide such a control valve in which a balance chamber is provided on the opposite side of the poppet from the inlet. The balancing chamber is connected to the pressure adjacent to the midportion of the poppet. The pressure in the balancing chamber acts to counter-balance the movement of the poppet.

A more particular object of the invention is to provide a valve in which the poppet and seat are formed complementarily to each other along a curve extending continuously from vertical to horizontal. One of the members is provided with corrugations or undulations which provide a plurality of adjacent valve seats which are engaged by the other member. In the particular embodiment shown and described herein, the larger size undulations are formed on the valve seat, while the smaller undulations are for manufacturing convenience carried by the inlet end of the poppet.

Another object of the invention is to provide a valve of the type described in which a seal is provided toward but not at the inlet end of the poppet, in an area in which tolerances and dimensions are small. A stationary sealing member of spring-type material is undercut to provide a lip which is adapted to flex slightly to engage and seal with one of the corrugations carried by the inlet end of the poppet. The undercut lip is adapted to be held in sealing engagement with the poppet by high fluid pressure from the inlet.

Another object of the invention is to provide a control valve as described in which the corrugations or undulations which form the orifices act as "spoilers" and interfere with the flow of fluid, to thereby reduce its speed as it passes around the corrugations.

It is accordingly among the objects of the invention to provide a valve of the type described having all of the advantages and benefits of the structure set forth above and described in further detail hereinafter in this specification.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE DRAWINGS

FIG. 1 is a longitudinal sectional view of a control valve constructed in accordance with the invention;

FIG. 2 is a transverse sectional view of the spring housing of the same, taken on line 2-2 of FIG. 1;

FIG. 3 is an enlarged sectional view of the sealing member;

FIG. 4 is an enlarged sectional view of the seat and poppet orifices.

DESCRIPTION OF THE PREFERRED EMBODIMENT

A preferred embodiment which has been selected to illustrate the invention comprises an end cap 10, which is attached by locking screws 10a to one end of a valve seat support 11. The end cap 10 has a passage through its outer end forming an inlet 12. The inner end of the inlet 12 is connected to openings which extend through the centers of a stainless steel support member 13 and an adjacent beryllium copper sealing member 14, which are mounted within the inner end of the end cap 10 and the outer end of the seat support 11.

An O-ring seal 15 is provided adjacent to the outer end of the support member 13. A pair of O-ring seals 16 are mounted in spaced openings extending around the periphery of the support member 13.

The seat support 11 is connected to a valve body 17. A spring housing 18 is in turn connected to the valve body 17. In use, the inlet 12 normally faces downwardly and the upper end of the spring housing 18 forms the top of the valve. The term "vertical" or "upwardly" may accordingly be used herein as referring to a direction extending between the inlet 12 and the top of the spring housing 18.

The inner end of the seat support 11 is cut away to receive and support a specially fabricated valve seat 19. The inner surface of the valve seat 19 is provided with a plurality of spaced undulations or corrugations 20 which extend from what may be termed a transverse or horizontal position in use to a substantially vertical position toward the inlet 12.

The valve seat 19 is supported adjacent to its midportion by the seat support 11. The lower end of the valve seat 19 extends into the sealing member 14 adjacent the center thereof. The upper end of the valve seat 19 is held around its periphery between steps 21 and 21a which are formed on the valve body 17 and valve support 11.

An outlet chamber 22 formed in the valve body 17 is connected to an outlet 23 which extends through one side of the valve body 17.

A poppet 24 is mounted for reciprocal movement within the valve body 17 toward and away from the valve seat 19. The poppet 24 has its outer surface 25 contoured complementarily to the curvature of the projecting portions of the corrugations 20 and the valve seat 19.

The poppet 24 itself ends adjacent to the inner edge of the sealing member 14. The poppet 24 carries a poppet extension 26, the inner end of which is threadedly mounted in the poppet 24 and the other end of which is contoured along the same curve as the outer surface of the poppet 24.

An O-ring 27 mounted in an opening formed in the sealing member 14 is disposed directly adjacent to the end of the valve seat 19. It is adapted to make sealing engagement with a smooth portion 28 formed on the outside of the poppet extension 26.

The portion of the outer surface of the poppet extension 26 between the smooth portion 28 and the end of the poppet extension 26 is provided with a plurality of spaced undulations or corrugations 29 which effectively act as a continuation of the corrugations 20 formed on the valve seat 19. It should be understood that the positioning of the corrugations 20 and 29 in the embodiment shown was selected merely as a matter of manufacturing convenience and has no effect on the operation of the invention. The corrugations may be formed on either the poppet or the valve seat or both without changing the operation of the invention.

The opening through the center of the sealing member 14 which defines the fluid flow passage is curved complementarily to the outer surface of the poppet extension 26 and is adapted to engage the corrugations 29. When the poppet 24 and poppet extension 26 are in closed position, the free end of the poppet extension 26 extends into the opening formed in the center of the support member 13.

In the embodiment shown in the drawings, the sixth corrugation 29 inwardly or upwardly from the free end of the poppet extension 26 has been selected to make sealing engagement with the sealing member 14 in order to cut off flow between the inlet 12 and the outlet 23. This seal is achieved by forming an undercut 31 in the sealing member 14 parallel to its central opening to form an annular lip 30 along the flow passage.

Since the sealing member 14 is formed of spring-type material (beryllium copper), the lip 30 has a certain degree of resilience. The lip 30 is adapted to be flexed outwardly or transversely into sealing engagement with the sixth corrugation 29 of the poppet extension 26. High pressure from the inlet 12 is adapted to flow between the adjacent surfaces of the sealing member 14 and support member 13 to enter the undercut 31 behind the lip 30. This flow may be expedited by slightly trimming the adjacent surfaces of the support member 13 to provide a larger opening into the undercut 31. The high inlet pressure 12 is accordingly connected to the undercut 31, where it acts to flex the lip 30 inwardly into sealing engagement with the corrugation 29.

It should be noted that this positioning of the valve seat makes it possible to inspect and/or repair the seal by merely removing the support member 13.

A passage 32 is formed in the poppet 24 which extends upwardly or inwardly from a point adjacent to the midportion of the valve seat 19 to a balancing chamber 32 which is formed in the valve body 17. The amount of pressure in the balancing chamber 32 is accordingly substantially equal to the pressure adjacent to the midportion of the valve seat 24. It will be noted that this pressure acts against the inner end of the poppet 24 and acts as a counter-balance which cushions or slows the inward or upward movement of the poppet 24 from closed to open position.

The inner end of the poppet 24 is threadedly connected to one end of a poppet rod 33, the opposite end of which is disposed beneath a spring plate 34. The spring plate 34 is disposed beneath and subject to pressure exerted against it by four springs which are mounted in the spring housing 18.

The springs preferably comprise two diagonally arranged large springs 35 and two diagonally arranged smaller springs 36. Secondary springs 35a and 36a are mounted concentrically with the springs 35 and 36 around the same spring rods 35b and 36b. Adjusting nuts 35c and 36c are mounted on the ends of the spring rods.

The inner end of the poppet extension 26 extends into an axial opening formed in the poppet 24. Its inner end may be spaced from the adjacent end of the poppet rod 22 by a chamber 38, as shown in the drawings, or the ends of the poppet extension 26 and poppet rod 33 may engage each other by serrations or otherwise. The end of the poppet rod 33 which fits within the poppet 24 may be provided with a screw driver receiving slot for facilitating separation of the poppet rod 33 and poppet 24.

A passage 39 extends axially from the inlet end of the poppet extension 26 to the chamber 38. A corresponding passage 40 extends axially through the adjacent portion of the poppet rod 33 and then transversely to connect with a chamber 41, which extends around and beneath an enlargement 42 formed on the poppet rod 33. The chamber 41 is connected directly to the inlet pressure, which acts upon the poppet rod 33 to move the poppet 24 toward opening position.

When the valve is in use, it will be noted that increased pressure at the inlet 12 will move the poppet 24 and poppet extension 26 upwardly or inwardly. This lifts the transverse portion of the outer surface of the poppet 24 away from the transversely directed corrugations 20 of the valve seat 19 to cause these orifices to become substantially completely opened.

As the poppet 24 and poppet extension 26 continue to move toward open position, more of the orifices become completely open and the others become increasingly open, progressing from the most transversely directed adjacent the outlet to those which are substantially parallel to the direction of poppet movement and are disposed adjacent to the inlet.

The valve accordingly provides a plurality of spaced orifices which open sequentially from the outlet side toward the inlet side. The orifices also open to limited degrees progressively from the outlet to the inlet side. The orifices accordingly provide a plurality of pressure drops which reduce the pressure and the speed of fluid flow from the inlet to the outlet. The undulations which form the orifices also provide a tortuous path of undulations which interfere with the fluid flow and cause turbulence which further reduces the pressure and speed of flow.

The valve accordingly provides a plurality of orifices of progressively smaller diameter and of progressively greater restriction from the outlet to the inlet, with the added restriction of turbulence due to flow around the protuberances.

The valve of the present invention is capable of being constructed and arranged so that the maximum pressure drop across any seat or orifice is 500 psi. The velocities through all portions of the valve are held below mach.4 in order to minimize noise and the velocity of flow is held approximately constant throughout the entire flow area. The entrances and exits are made as non-turbulent as feasible. The valve design is non-fouling due to its formation.

The valve lends itself to balancing, so that it can be used in pressure regulating or priority valve applications. Other silent or low noise level valves are usually shut-off valves and are not feasible for use where balancing is required.

It will be noted that because of the arrangement of the orifices, the effective poppet stroke increases progressively from the inlet to the outlet.

I claim:

1. A low noise level control valve comprising (i) an inlet and (ii) an outlet, (iii) a poppet mounted for movement on a given line with respect to a valve seat between open and closed positions to control the flow of fluid from said inlet to said outlet, (iv) means defining a plurality of spaced orifices disposed between the periphery of said poppet and said valve seat, said orifices being constructed and arranged so that they are of progressively increasing diameter and progressively more transverse to the direction of movement of said poppet in relation to their distance away from said inlet, and (v) a balancing chamber disposed on the opposite side of said poppet from said inlet, a passage extending through said poppet to connect said balancing chamber to a point adjacent to approximately the mid-portion of said means defining said orifices to provide pressure in said chamber to counter-balance the opening movement of said poppet.

2. The structure described in claim 1, said orifices being defined by a plurality of undulations, said undulations acting to form flow restricting passages and simultaneously causing turbulence as fluid flows around them.

3. The structure described in claim 2, said undulations extending along a continuously curved line, said line curving away from the line of movement of said poppet.

4. The structure described in claim 3, said curved line extending for approximately 90° from a line substantially parallel to the direction of movement of said poppet adjacent to said inlet to a line substantially transverse to the direction of movement of said poppet adjacent to said outlet.

5. The structure described in claim 4, at least the major portion of said undulations being formed on a valve seat surrounding said poppet, the outer surface of said poppet being formed complementarily to said undulations.

6. The structure described in claim 3, and means for providing pressure to resist and counter-balance the opening movement of said poppet.

7. The structure described in claim 5, and a plurality of undulations formed on the outer surface of said poppet adjacent to said inlet.

8. The structure described in claim 4, and a sealing member surrounding the portion of said poppet adjacent to said inlet, said sealing member having means for making sealing engagement with said poppet.

9. A low noise level control valve comprising (i) an inlet and (ii) an outlet, (iii) a poppet mounted for movement on a given line with respect to a valve seat between open and closed positions to control the flow of fluid from said inlet to said outlet, (iv) means defining a plurality of spaced orifices disposed between the periphery of said poppet and said valve seat, said orifices being constructed and arranged so that they are of progressively increasing diameter and progressively more transverse to the direction of movement of said poppet in relation to their distance away from said inlet, (v) a sealing member surrounding the portion of said poppet adjacent to said inlet, said sealing member having means for making sealing engagement with said poppet, said sealing member having an undercut opening forming a lip, said lip being resilient, and (vi) means connecting said undercut opening to said inlet to provide pressure in said undercut opening to urge said lip into sealing engagement with said poppet.

10. The structure described in claim 9, and support member removably mounted adjacent to said sealing member, the inner surface of said support member being disposed directly adjacent to said lip of said sealing member so that said support member can be removed to provide access to said lip.

11. The structure described in claim 9, said orifices being defined by a plurality of undulations, said undulations acting to form flow restricting passages and simultaneously causing turbulence as fluid flows around them.

12. The structure described in claim 11, said undulations extending along a continuously curved line, said line curving away from the line of movement of said poppet.

13. The structure described in claim 12, said curved line extending for approximately 90° from a line substantially parallel to the direction of movement of said poppet adjacent to said inlet to a line substantially transverse to the direction of movement of said poppet adjacent to said outlet.

14. The structure described in claim 13, at least the major portion of said undulations being formed on a valve seat surrounding said poppet, the outer surface of said poppet being formed complementarily to said undulations.

15. The structure described in claim 12, and means for providing pressure to resist and counter-balance the opening movement of said poppet.

16. The structure described in claim 13, and a balancing chamber disposed on the opposite side of said poppet from said inlet, a passage extending through said poppet to connect said balancing chamber to a point adjacent to approximately the mid-portion of said undulations to provide pressure in said chamber to counter-balance the opening movement of said poppet.

17. The structure described in claim 14, and a plurality of undulations formed on the outer surface of said poppet adjacent to said inlet.

18. The structure described in claim 1, and a sealing member surrounding the portion of said poppet adjacent to said inlet, said sealing member having means for making sealing engagement with said poppet.

19. The structure described in claim 18, said sealing member having an undercut opening forming a lip, said lip being resilient, and means connecting said undercut opening to said inlet to provide pressure in said undercut opening to urge said lip into sealing engagement with said poppet.

20. The structure described in claim 19, and support member removably mounted adjacent to said sealing member, the inner surface of said support member being disposed directly adjacent to said lip of said sealing member so that said support member can be removed to provide access to said lip.

* * * * *